United States Patent [19]

Rous

[11] E Re. 28,460

[45] Reissued July 1, 1975

[54] CARTON

[75] Inventor: Benjamin Rous, New York, N.Y.

[73] Assignee: Stone Container Corporation, Chicago, Ill.

[22] Filed: Sept. 24, 1973

[21] Appl. No.: 400,138

Related U.S. Patent Documents

[64] Patent No.: 3,682,370
Issued: Aug. 8, 1972
Appl. No.: 31,239
Filed: Apr. 23, 1970

[52] U.S. Cl. ..... 206/424; 229/40
[51] Int. Cl. ..... B65d 5/02; B65d 5/08
[58] Field of Search ..... 229/34 R, 34 B, 34 HW, 229/40, 87 R, 16 C, 16 D; 206/424

[56] References Cited

UNITED STATES PATENTS

| | | | |
|---|---|---|---|
| 1,948,083 | 2/1934 | Warner | 229/16 C |
| 2,950,850 | 8/1960 | Corcoran | 229/16 C |
| 3,110,435 | 11/1963 | Layne, Sr. | 229/40 |
| 3,137,435 | 6/1964 | Meyers | 229/40 |
| 3,250,454 | 5/1966 | Plunkett | 229/34 HW |
| 3,250,455 | 5/1966 | Plunkett | 229/34HW |
| 3,252,650 | 5/1966 | Pryor | 229/40 |
| 3,370,777 | 2/1968 | Levi | 229/40 |
| 3,386,641 | 6/1968 | Cassidy | 229/40 |
| 3,386,642 | 6/1968 | Young | 229/40 |
| 3,399,821 | 9/1968 | Ringholz | 229/40 |

FOREIGN PATENTS OR APPLICATIONS

| | | | |
|---|---|---|---|
| 803,348 | 1/1969 | Canada | 229/34 HW |

*Primary Examiner*—William I. Price
*Assistant Examiner*—Stephen Marcus
*Attorney, Agent, or Firm*—Darby & Darby

[57] ABSTRACT

A carton for packaging an article is formed from a single piece blank of paperboard and includes a bottom wall, two end flaps each having two side flaps, two center side flaps, two end walls and two side walls. The normally oblique side and end walls and the end side flaps initially position the article to be packaged centrally of the bottom wall and combine with the bottom wall to form an air cell about the four sides of the article to protect it during shipment.

3 Claims, 9 Drawing Figures

INVENTOR.
BENJAMIN ROUS

BY Darby & Darby

ATTORNEYS

INVENTOR.
BENJAMIN ROUS

BY Darby & Darby

ATTORNEYS

INVENTOR.
BENJAMIN ROUS

BY Darby & Darby

ATTORNEYS

INVENTOR.
BENJAMIN ROUS

BY Darby + Darby

ATTORNEYS

CARTON

Matter enclosed in heavy brackets [ ] appears in the original patent but forms no part of this reissue specification; matter printed in italics indicates the additions made by reissue.

---

In the carton packaging industry, it is conventional to provide tubular bumpers about the periphery of a carton to protect the contents of the carton from injury during shipment. The hollow bumpers which are often constructed from the side flaps of the carton blanks form air cells or cushions about the periphery of the article that protect the article against damage if the carton is dropped or bumped on its side.

However, the formation of tubular bumpers on a carton blank is often time-consuming and expensive, since the carton blanks are either shipped to the ultimate user with the tubular bumpers already glued (thereby increasing shipping space and costs) or they are shipped in a substantially flat position and the tubular bumpers must be erected by the ultimate user either manually (which is time-consuming) or with expensive machinery. Further adding to the cost of erecting tubular bumpers on cartons is the cost of gluing the bumpers to the carton blanks to secure them in place. When a small article is to be packaged, such as a small single book, or numerous small articles, such as pamphlets, the time and expense of forming tubular bumpers on the packaging carton to protect the articles is often not warranted.

It is also conventional in the carton packaging industry to reinforce the corners of a carton in order to protect the fragile corners of the packaged article. Although the corners of a carton having tubular bumpers about its entire periphery are sufficiently reinforced, additional construction is necessary in those cartons having tubular bumpers on only two sides of the carton. This additional construction usually takes the form of additional material at the corners of the carton either integral with the carton corner or in the form of separate packing material. As with the tubular bumpers, these reinforced corners are time-consuming and expensive to construct because of the additional steps and material necessary.

It is accordingly an object of this invention to provide a carton for packaging an article which is relatively easy and inexpensive to manufacture and erect and which provides an air cushion or cell about the periphery of the article.

It is a further object of this invention to provide a carton for packaging an article which automatically positions the article centrally of the carton air cell.

It is a further object of this invention to provide a carton for packaging an article which has sufficient strength at the corners to prevent injury to the article.

It is a further object of this invention to provide a carton with an air cushion about its periphery which is adapted for packaging in high speed machinery.

It is a further object of this invention to provide a carton with an air cushion about its periphery which is adapted to package a number of small articles.

This invention provides a carton for packaging an article which is formed from a single piece of paperboard and which is composed of a bottom wall, two end flaps each having side flaps, two side walls, two end walls and two center side flaps. The end side flaps and the side and end walls combine with the bottom wall to form an oblique air cell about the periphery of the article to be packaged. The side and end walls extend upwardly at an angle from the bottom wall of the carton to form an oblique air cell about the packaged article. The end flaps and the center side flaps are folded over in an overlapping fashion parallel to the bottom wall to form the top wall of the carton.

In the preferred embodiment of the invention, each of the end side flaps is folded over to form a reinforced double flap which is coextensive with and angled to substantially the same degree as the side wall of the carton. Each of the end side flaps engages a portion of the side of the packaged article and positions it centrally of the carton bottom wall. The side walls and the end side flaps prevent the packaged article from slipping or shifting to one side or the other in the carton so that the oblique air cell is continually maintained about the periphery of the article.

In an alternate embodiment of the invention, each of the end side flaps is L-shaped with the vertical portion extending downwardly from each end flap and the horizontal portion extending outwardly toward the corner formed between the bottom wall of the carton and the side wall. The end flaps and the end side flaps in the alternate embodiment also serve to position the packaged article in the carton and prevent it from slipping thereby maintaining the oblique air cell about its periphery.

Another feature of this invention is that the center side flaps which are folded over parallel to the bottom wall of the carton and form the top of the carton extend outwardly at their lateral edges to protect the corners of the article against damage.

Another feature of this invention is that the oblique corners of the carton are cut so as to close the corners against dirt or other contaminants.

Another feature of this invention is that the carton is inexpensive to manufacture. The formation of the oblique air cell by the side and end walls reduces the amount of paperboard that would be necessary to achieve similar protection by using tubular bumpers. There is a further saving in that gluing is not necessary to keep the oblique air cell in position as with the tubular bumpers. The only gluing required can be done by the ultimate user and this gluing involves only a single line across the top of the carton to close it. Also, the carton of this invention can be shipped in a substantially flat position thereby reducing freight costs over the shipment of cartons having erected tubular bumpers.

Another feature of this invention is that the carton is adapted to be used with existing high speed machinery whereas automatic packaging machines for cartons having tubular bumpers are still being developed.

These and other objects and features of this invention will be more readily understood and appreciated by reference to the following descriptions and drawings of which:

Figure 1:
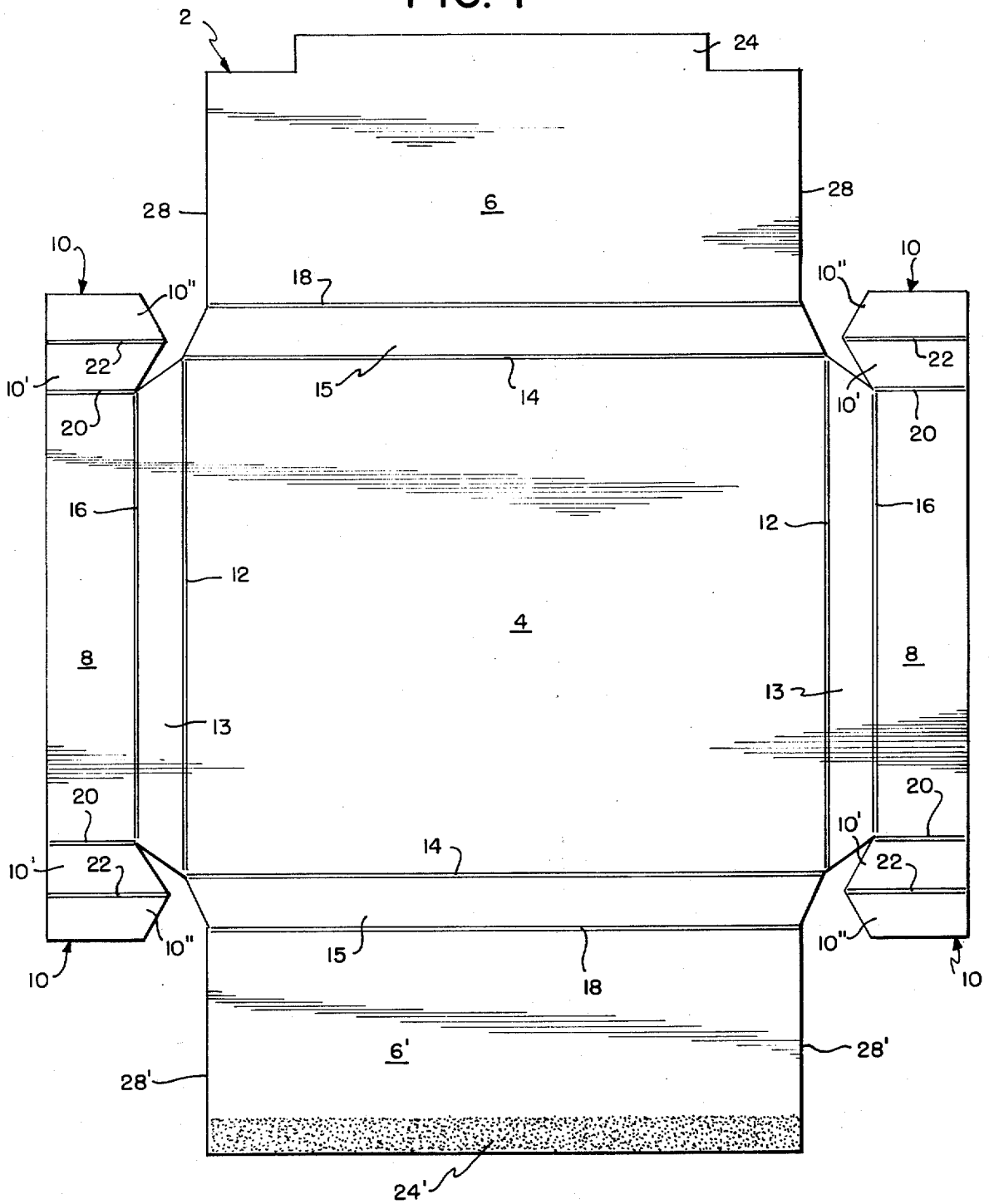
FIG. 1 is an enlarged plan view of an unerected carton of this invention showing the preferred embodiment.

Referring now to FIG. 1, the carton 2 is illustrated as it would appear after having been cut and scored from a single piece blank of paperboard. The carton 2 includes a bottom wall 4, two center side flaps 6 and 6′ respectively, two end flaps 8 each having two side flaps 10, two end walls 13 and two side walls 15.

The substantially rectangular bottom wall 4 is bounded on two sides by score lines 14 which separate the bottom wall from each of the side walls 15 which are substantially trapezoidal in shape. Each of the score lines 14 is coextensive with the base of the adjoining trapezoidal side wall 15. Score lines 18 separate each of the side walls 15 from each of the center side flaps 6 and 6′ which are substantially rectangular in shape and which have lateral edges 28 and 28′ respectively. The center side flap 6 has a rectangular portion 24 at its extremity that underlays the outer edge 24 of flap 6′. This outer edge 24′ receives glue which adheres the flap portion 24 as well as the portion of end flaps 8 underlying the glued outer edge of flap 6′ when the carton is closed, as illustrated in FIG. 3.

The other two edges of the bottom wall 4 are bounded by score lines 12 which separate trapezoidal shaped end walls 13 from the bottom wall. Each of the bases of the trapezoidal end walls 13 is coextensive with the adjoining score line 12. The end flaps 8 are each separated from the end walls 13 by score lines 16. The end flaps 8 are substantially rectangular in shape and each have two end side flaps 10 at their extremities. The end side flaps 10 are each hinged to an end of each of the end flaps 8 along score lines 20. The end side flaps 10 are divided into an inner portion 10′ and an outer portion 10″ by score line 22, each portion being in the shape of a trapezoid with the bases of the trapezoidal portions abutting each other and coextensive with the score line 22.

Figure 2:
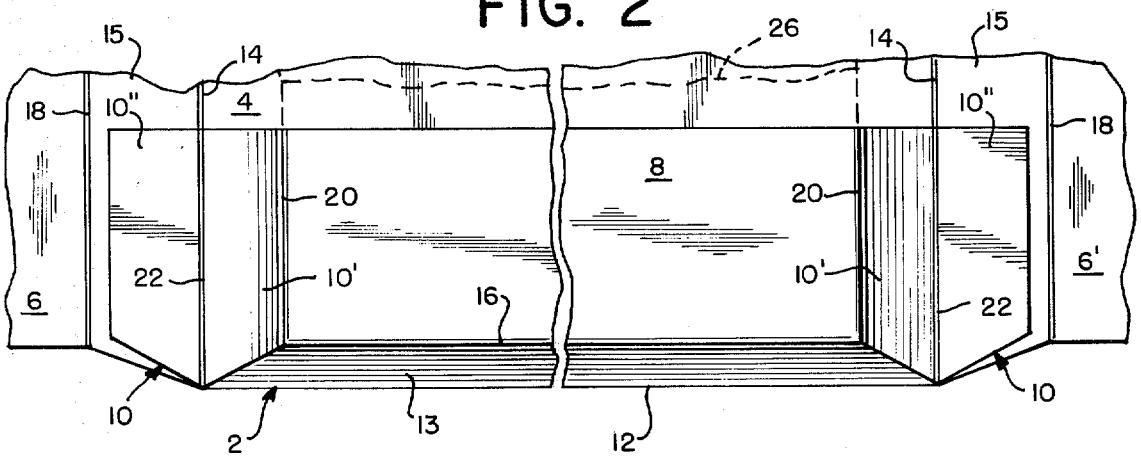
FIG. 2 is an enlarged plan view of a partially erected portion of the carton which is illustrated unerected in FIG. 1.

Referring not to FIG. 2, a portion of the carton 2 is illustrated in a partially erected position. The end wall 13 is shown in an erected position having been bent along score line 14 to form an acute angle with the bottom wall 4. The end flap 8 has been bent along score line 16 so as to be substantially parallel to the horizontally extending bottom wall 4. The inner portion 10′ of the end side flap 10 is bent downwardly from end flap 8 along score line 20 so as to form an angle with the bottom wall 4 which is substantially similar to the angle formed with the bottom wall by the end wall 13. The outer portion 10″ of the side end flap 10 is bent along score line 22 so that it is substantially parallel to the unerected horizontally extending side wall 15. When the side wall 15 is erected, as illustrated in FIG. 3, the end side flap outer portion 10″ is bent along score line 22 so as to overlie the end side flap inner portion 10′. The article 26 to be packaged, such as a book for example, is partially illustrated in dotted lines in FIG. 2. The end edge of the article 26, in FIG. 2, is coextensive with score lines 16 on the partially erected carton.

Figure 3:
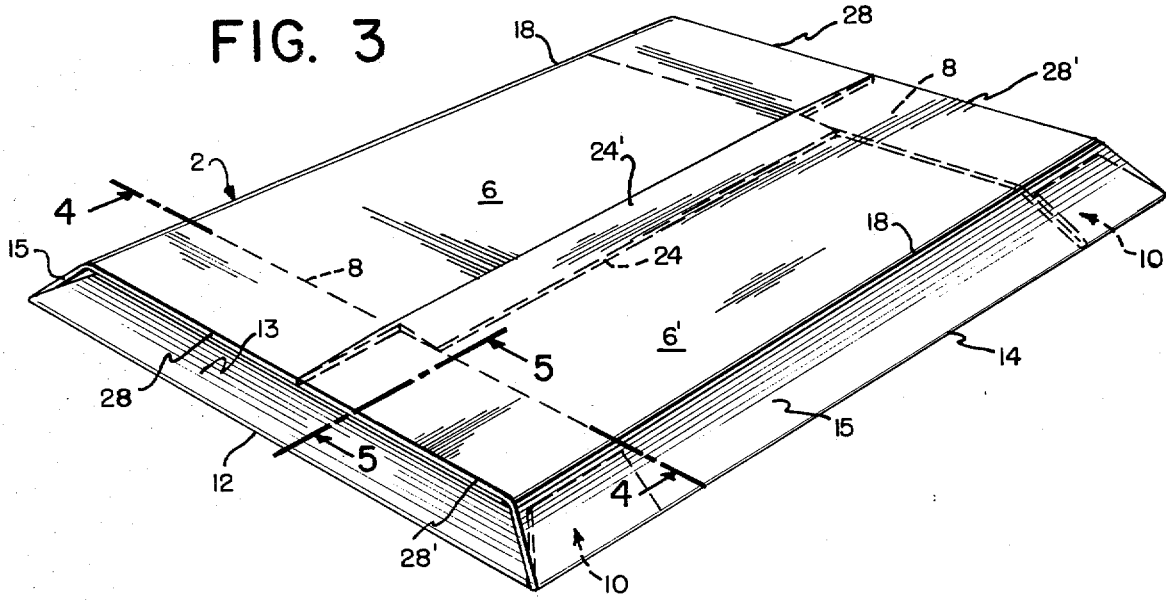
FIG. 3 is a perspective view of the erected carton which is illustrated unerected in FIG. 1.

Referring now to FIG. 3, the erected carton 2 is illustrated. The end walls 13 and the side walls 15 are bent along score lines 12 and 14 respectively to form acute angles with the bottom wall of the carton thereby forming an oblique air cell or air cushion about the periphery of the carton. The oblique air cell provides protection for the article 26 in the carton in the same manner as cartons which have tubular bumpers about their periphery.

The center side flaps 6′ and 6′ are folded along the score line 18 so as to be substantially parallel to the horizontally extending bottom wall 4 and the upper surface of the article 26. The center side flap 6 having the rectangular portion 24 is folded under the other center side flap 6′. Glue may be applied to the inner contacting surface of the outer edge 24″ or a strip of tape may be applied to the outer surface of the outer edge so as to adhere to the end flaps 8 to securely close the carton. The center side flaps 6 and 6′ are closed tightly against the article 26 contained within the carton.

Figure 4:
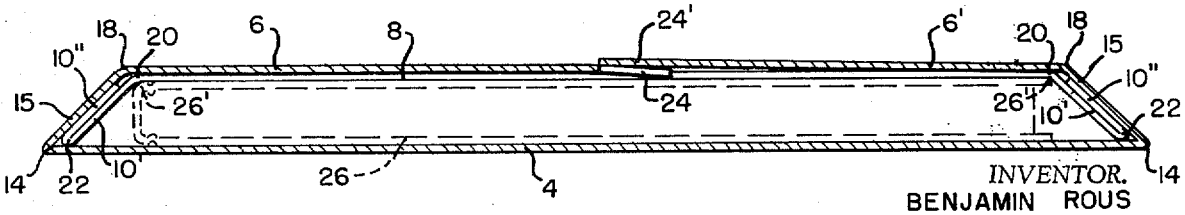
FIG. 4 is a cross-sectional view of the carton illustrated in FIG. 3 taken along the line 4—4.

Referring now to FIG. 4, a cross-sectional view of the article 26 contained with the erected carton 2 is illustrated. The oblique air cushion is formed by the side wall 15 and the portion 4′ of the bottom wall 4 on which the article 26 is not supported. The article 26 is prevented from laterally shifting into the oblique air cell by the end side flaps 10. The corner 26′ formed by the top and side of the article 26 is engaged by the end side flap inner portion 10′ which forms an acute angle with the bottom wall substantially similar to the angle formed by side wall 15; and the end side flap outer portion 10′ which is folded over the inner portion 10′ so as to be coextensive with it engages the inner surface of the side wall 15. The cooperation of the end side flap 10 with the side wall 15 prevents the article 26 from shifting or slipping into the oblique air cushion. This embodiment of the invention is better adapted to packaging a single item, such as a book, in which the lower portion would not shift into the oblique air cell as long as the upper portion of the article (corner 26′ in FIG. 4) was restrained. The alternate embodiment of this invention, as is described below, is specifically adapted to package a number of loose articles so that they do not shift into the oblique air cell.

Figure 5:
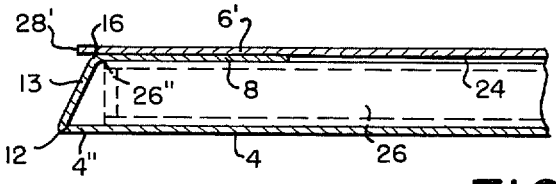
FIG. 5 is a cross-sectional view of the carton illustrated in FIG. 3 taken along the line 5—5.

Referring now to FIG. 5, the oblique air cell formed by the end wall 13 and the portion 4″ of the bottom wall 4 on which the article 26 is not supported is illustrated. The corner formed by the end wall 13 and the end flap 8 at the score line 16 engages the corner 26″ of the article 26 and prevents the article from shifting into the oblique air cell.

Referring now to FIGS. 3 and 5, the outer lateral edges 28 and 28′ of center side flaps 6 and 6′ respectively are extended outwardly so as to overlap the junction of end wall 13 and end flap 8 at score line 16. The lateral edges 28 and 28′ are extended outwardly to provide further protection against damage for the article 26 in the event the carton is dropped or crushed on its upper end edge. It is not necessary to extend the lateral edges 28 and 28′ outwardly across the entire width of the carton since the extension at the corners provides the necessary strength. Also, if the carton is sealed with tape, the recessed edge formed at the center of the carton by lateral edges 28 and 28' permits continuous contact between the tape and the carton.

Referring now to FIGS. 4 and 5, the end walls 13 and the end side flaps 10 also position the article 26 centrally of the bottom wall 4 so that the oblique air cell extends about the periphery of the article.

Figure 6:
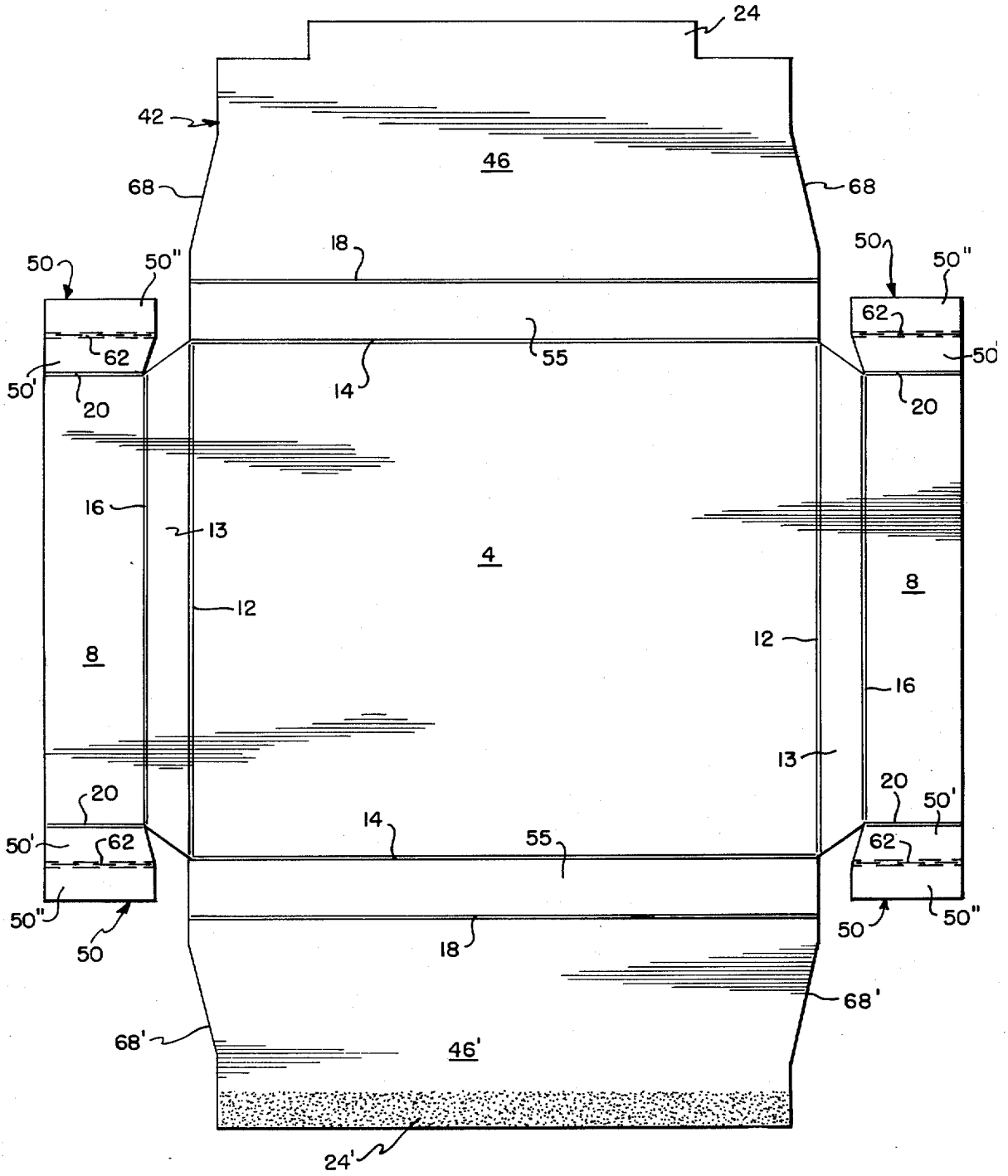
FIG. 6 is an enlarged plan view of an unerected carton of this invention showing an alternate embodiment.

Referring now to FIG. 6, the carton 42 is illustrated as it would appear after having been cut and scored from a single piece blank of paperboard. With the exception of those features of the alternate embodiment of this invention described below, the numerals in FIGS. 6–9 which are the same as numerals appearing in FIGS. 1–5 represent corresponding features of the preferred embodiment of this invention. Accordingly, those features of the alternate embodiment of the invention designated by numerals appearing in FIGS. 1–5 (generally, numerals 2–28) respond to the same description as, and are the same as, those features in the preferred embodiment designated by corresponding numerals.

The alternate embodiment of this invention primarily differs from the first embodiment of this invention in the structure and function of the end side flaps 50 which are at the extremities of the end flaps 8. The inner portion 50' of the side end flap is hinged to the outer portion 50'' of the flap by alternately cut score line 62. The cuts in the score line reduce the resiliency of each portion of the end side flap with relation to the other end side flap so that the position the end side flap assumes has less of a tendency to be disturbed than if there were no cuts in the score line. The end side flap outer portion 50'' is substantially in the shape of a rectangle while the end side flap inner portion 50' is substantially in the shape of a trapezoid.

Another difference between the alternate embodiment of this invention and the preferred embodiment is that the side walls 55 in the alternate embodiment are substantially rectangular in shape, instead of trapezoidal as in the preferred embodiment. Furthermore, the center side flaps 46 and 46' extend outwardly from the score lines 18 so that their lateral edges 68 and 68' respectively are coextensive with the lateral edges of the side walls 55. The lateral edges 68 and 68' then taper as they proceed further outwardly and finally extend outwardly in a straight line.

Figure 7:
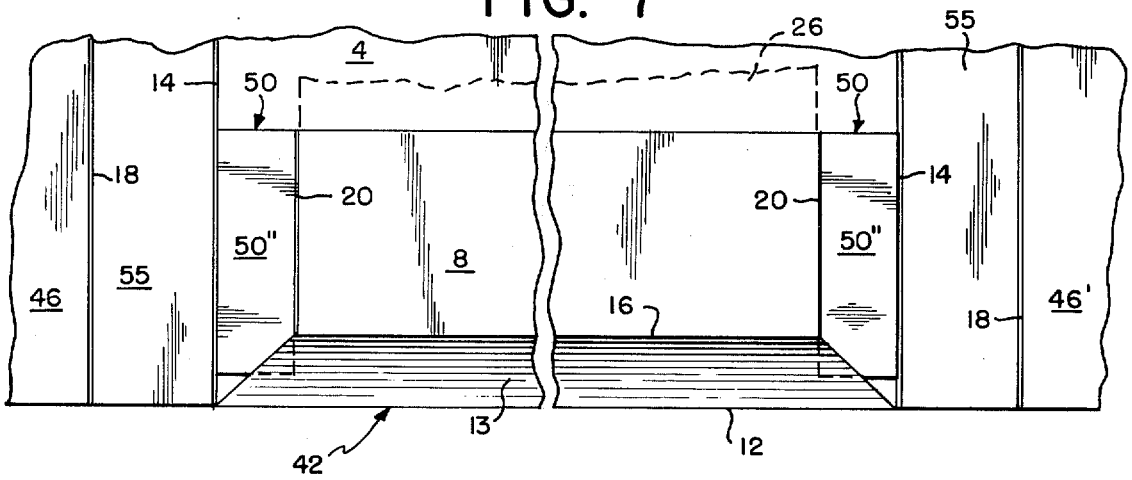
FIG. 7 is an enlarged plan view of a partially erected portion of the carton which is illustrated unerected in FIG. 6.

Referring now to FIG. 7, the carton illustrated unerected in FIG. 6 is shown partially erected in FIG. 7. The end wall 13 is bent along the score line 12 to form an acute angle with the bottom wall 4 of the carton and the end flap 8 is bent along score line 16 to a position which is substantially parallel to the horizontally extending bottom wall 4. The end side flap inner portion 50' (not shown) is bent along the score line 20 so as to be perpendicular to the bottom wall 4. The end side flap outer portion 50'' is bent along alternately cut score line 62 so as to be substantially parallel to the horizontally extending bottom wall 4.

Figure 8:
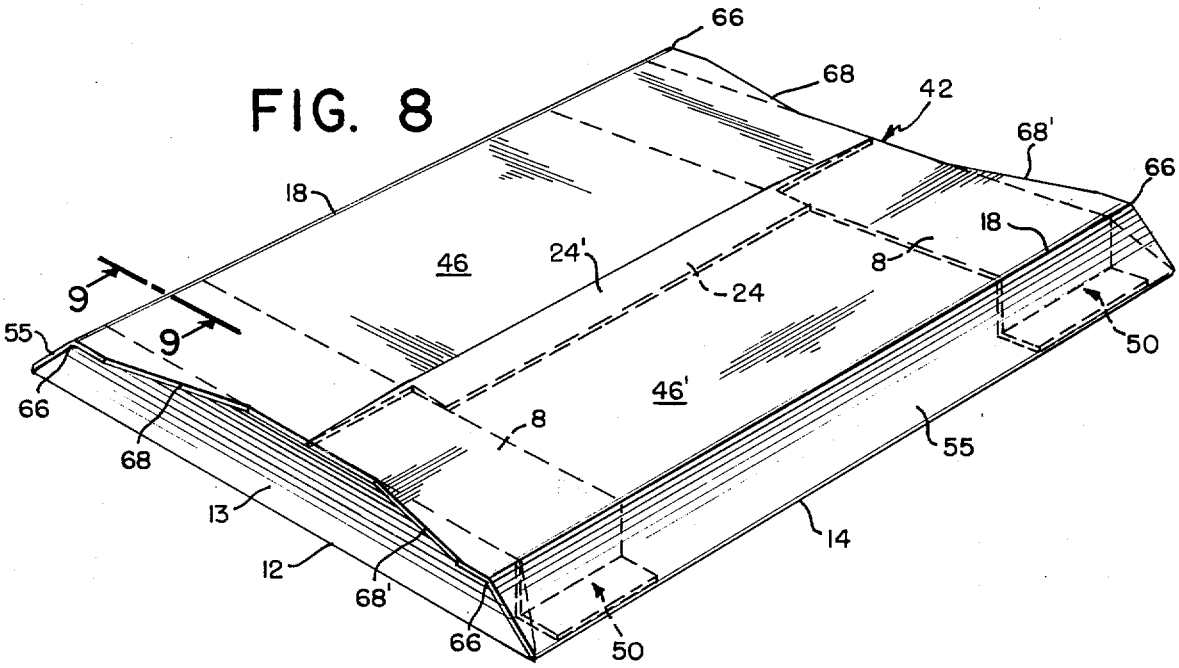
FIG. 8 is a perspective view of the erected carton which is illustrated unerected in FIG. 6.

Referring now to FIG. 8, the carton 42 is shown in an erect position. In view of the rectangular shape of the side walls 55 and the continuation of the lateral edges 68 and 68' so as to be coextensive with the edges of the side walls 55, the corner 66 formed at the junction of the side wall 55 and the center side flap 46 juts outwardly so as to even with the lateral edge 12 of the bottom wall of the carton thereby affording greater protection at the corners of the carton.

Figure 9:
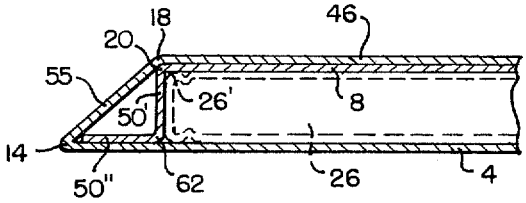
FIG. 9 is a cross-sectional view of the carton illustrated in FIG. 8 taken along the line 9—9.

Referring now to FIG. 9, the vertically extending end side flap inner portion 50', the horizontally extending end side flap outer portion 50'', and the side wall 55 combine to form an oblique air cell about the periphery of the carton 42. This alternate embodiment is particularly adapted for packaging a number of smaller articles because the vertically extending inner portion member 50' engages the sides of all the articles 66 and prevents them from sliding laterally into the oblique air cell. Furthermore, as in the preferred embodiment, the end side flaps 50 and the end walls 13 position the articles 66 to be packaged centrally of the bottom wall.

While embodiments of various aspects of the invention have been shown in the drawings, it is to be understood that this disclosure is for the purpose of illustration only and that various changes in shape, proportion and arrangement of parts, as well as the substitution of equivalent elements for those herein shown and described, may be made without departing from the spirit and scope of the invention as set forth in the appended claims.

What is claimed is:

1. A carton for packaging an article comprising:

a bottom wall, a first and second pair of walls, each of said first and second pair of walls being joined to said bottom wall, said second walls being oblique with respect to said bottom wall, said oblique second walls forming an air cell for protecting the article in the carton, a first flap being joined to each of said first walls and being parallel to said bottom wall, a second flap being joined to each of said second walls and being parallel to said bottom wall, *at least one of* said first flaps including a pair of third flaps, each of said pair of third flaps being positioned at each end of said first flap, each of said pair of third flaps including a first member and a second member, said first and second members being hinged along a common score line, said common score line being positioned to bear against the intersection between said second and bottom walls [.], *at least a portion of said first member bearing against the article for positioning the article centrally of said bottom wall and preventing the article from slipping into the air cell.*

2. A carton for packaging an article comprising:

a bottom wall, a first and second pair of walls, each of said first and second pair of walls being joined to said bottom wall, said second walls being oblique with respect to said bottom wall, said oblique second walls forming an air cell for protecting the article in the carton, a first flap being joined to each of said first walls and being parallel to said bottom wall, a second flap being joined to each of said second walls and being parallel to said bottom wall, *at least one of* said first flaps including a pair of third flaps, each of said pair of third flaps being positioned at each end of said first flap, each of said pair of third flaps including a first member and a second member, said first and second members being hinged along a common score line, said first and second members being folded over so as to be coextensive with each other and contiguous with said second walls, *at least a portion of said first member bearing against the article* for positioning the article centrally of said bottom wall and preventing the article from slipping into the air cell.

3. A carton for packaging an article comprising:

a bottom wall, a first and second pair of walls, each of said first and second pair of walls being joined to said bottom wall, said second walls being oblique with respect to said bottom wall, [ said oblique second walls forming an air cell for protecting the article in the carton,] a first flap being joined to each of said first walls and being parallel to said bottom wall, a second flap being joined to each of said second walls and being parallel to said bottom wall, *at least one of* said first flaps including a pair of third flaps, each of said pair of third flaps being positioned at each end of said first flap, each of said pair of third flaps including a first member and a second member, said first and second members being hinged along a common score line, *said first member being hingedly connected to said first flap,* said first and second members extending perpendicularly and contiguously respectively with respect to said bottom wall, *at least a portion of said first member bearing against the article* for positioning the article centrally of said bottom wall and preventing the article from slipping into the air cell [.] , *each of said first members and said oblique second walls forming respectively one leg and the hypotense of a right triangular air cell for protecting the article in the carton.*

* * * * *